US012620354B2

(12) United States Patent
Yu et al.

(10) Patent No.: US 12,620,354 B2
(45) Date of Patent: May 5, 2026

(54) LIGHT EMITTING DISPLAY DEVICE WITH DUTY DRIVING

(71) Applicant: LG Display Co., Ltd., Seoul (KR)

(72) Inventors: Ri Yu, Paju-si (KR); Bong-Hwan Kim, Paju-si (KR); Un-Seon Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/543,788

(22) Filed: Dec. 18, 2023

(65) Prior Publication Data

US 2024/0221664 A1 Jul. 4, 2024

(30) Foreign Application Priority Data

Dec. 30, 2022 (KR) ........................ 10-2022-0190481

(51) Int. Cl.
*G09G 3/3233* (2016.01)

(52) U.S. Cl.
CPC ....... *G09G 3/3233* (2013.01); *G09G 2310/08* (2013.01); *G09G 2340/0435* (2013.01)

(58) Field of Classification Search
CPC .............................................. G09G 3/30–3291
See application file for complete search history.

(56) References Cited

U.S. PATENT DOCUMENTS

2005/0104816 A1* 5/2005 Kimura ................ G09G 3/2022 345/76
2020/0082768 A1* 3/2020 Oh ........................ G09G 3/3291
2021/0183290 A1* 6/2021 Sato .......................... G09G 3/20
2022/0310001 A1* 9/2022 Youn ........................ G09G 5/10

* cited by examiner

*Primary Examiner* — Matthew A Eason
(74) *Attorney, Agent, or Firm* — Fish & Richardson P.C.

(57) ABSTRACT

A display device includes a light emitting diode disposed in a pixel; and an emission control transistor disposed in the pixel, and controlling on and off of the light emitting diode according to an emission control signal for each frame, wherein the frame includes a first duty cycle to a K-th duty cycle each of which sets an on-duty period and an off-duty period, and wherein the on-duty period of the first duty cycle is longer than the on-duty period of each of the second to K-th duty cycles.

22 Claims, 7 Drawing Sheets

LIGHT EMITTING DISPLAY DEVICE WITH DUTY DRIVING

CROSS-REFERENCE TO RELATED APPLICATION

The present application claims the priority of Korean Patent Application No. 10-2022-0190481 filed on Dec. 30, 2022, which is hereby incorporated by reference in its entirety.

BACKGROUND

Field of the Disclosure

The present disclosure relates to a light emitting display device.

Description of the Background

As the information society develops, a demand for display devices for displaying images have increased in various forms, and in recent years, various flat display devices such as light emitting display devices and liquid crystal display devices have been used.

The light emitting display device uses a light emission control signal to control an emission of a light emitting diode. To improve a stain or the like, a so-called duty driving is performed in which one frame is divided into a plurality of duty cycles and the light emitting diode is repeatedly turned on/off.

However, in the duty driving, when displaying a low luminance, an anode charging of the light emitting diode is delayed, and light may not be properly emitted at an initial duty cycle of the frame. Accordingly, there may occur a problem that when switching frames, a large difference in luminance occurs and is recognized as a flicker.

SUMMARY

An advantage of the present disclosure is to provide a display device that may improve occurrence of flicker when switching frames in a duty driving.

Additional features and advantages of the disclosure will be set forth in the description which follows, and in part will be apparent from the description, or may be learned by practice of the disclosure. These and other advantages of the disclosure will be realized and attained by the structure particularly pointed out in the written description and claims hereof as well as the appended drawings.

To achieve these and other advantages and in accordance with the purpose of the present disclosure, as embodied and broadly described herein, a display device includes: a light emitting diode disposed in a pixel; and an emission control transistor that disposed in the pixel, and controls on and off of the light emitting diode according to an emission control signal for each frame, wherein the frame includes a first duty cycle to a K-th duty cycle each of sets an on-duty period and an off-duty period, and wherein the on-duty period of the first duty cycle is longer than the on-duty period of each of the second to K-th duty cycles.

In another aspect, a display device includes: a light emitting diode; an emission control transistor that is connected to the light emitting diode, and controls on and off of the light emitting diode for each frame, wherein the frame includes a first duty cycle to a K-th duty cycle each of sets an on-duty period and an off-duty period, and wherein the on-duty period of the first duty cycle is longer than the on-duty period of each of the second to K-th duty cycles.

It is to be understood that both the foregoing general description and the following detailed description are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this specification, illustrate aspects of the disclosure and together with the description serve to explain the principles of the disclosure.

In the drawings.

DETAILED DESCRIPTION

Figure 1:
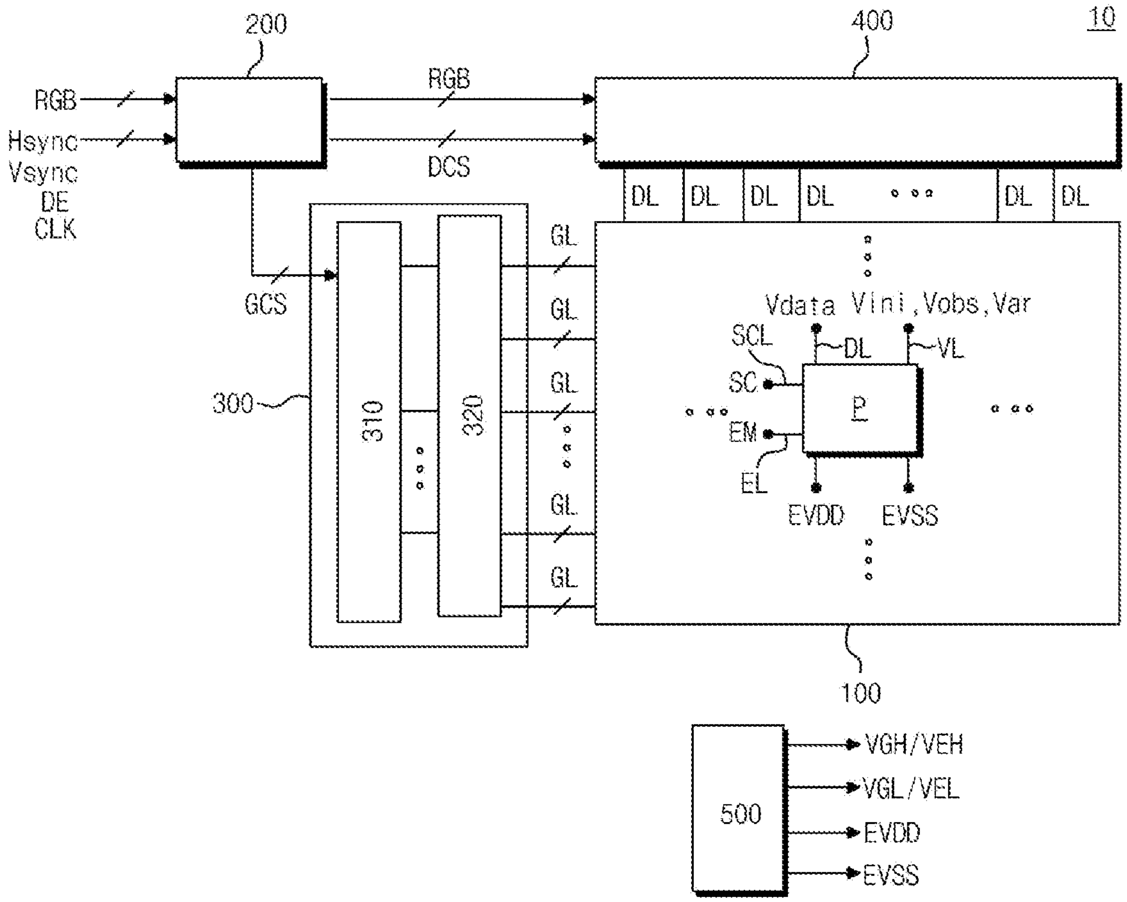
FIG. 1 is a view schematically illustrating a display device according to a first aspect of the present disclosure.

Advantages and features of the present disclosure and methods of achieving them will be apparent with reference to the aspects described below in detail with the accompanying drawings. However, the present disclosure is not limited to the aspects disclosed below, but may be realized in a variety of different forms, and only these aspects allow the present disclosure to be complete. The present disclosure is provided to fully inform the scope of the disclosure to the skilled in the art of the present disclosure, and the present disclosure may be defined by the scope of the claims.

The shapes, sizes, proportions, angles, numbers, and the like disclosed in the drawings for explaining the aspects of the present disclosure are illustrative, and the present disclosure is not limited to the illustrated matters. The same reference numerals refer to the same components throughout the description.

Furthermore, in describing the present disclosure, if it is determined that a detailed description of the related known technology unnecessarily obscure the subject matter of the present disclosure, the detailed description thereof may be omitted. When 'comprising', 'including', 'having', 'consisting', and the like are used in this disclosure, other parts may be added unless 'only' is used. When a component is expressed in the singular, cases including the plural are included unless specific statement is described.

In interpreting the components, even if there is no separate explicit description, it is interpreted as including a margin range.

In the case of a description of a positional relationship, for example, when the positional relationship of two parts is described as 'on', 'over', 'above', 'below', 'beside', 'under', and the like, one or more other parts may be positioned between such two parts unless 'right' or 'directly' is used.

In the case of a description of a temporal relationship, for example, when a temporal precedence is described as 'after', 'following', 'before', and the like, cases that are not continuous may be included unless 'directly' or 'immediately' is used.

In describing components of the present disclosure, terms such as first, second and the like may be used. These terms are only for distinguishing the components from other components, and an essence, order, order, or number of the components is not limited by the terms.

Respective features of various aspects of the present disclosure may be partially or wholly connected to or combined with each other and may be technically interlocked and driven variously, and respective aspects may be independently implemented from each other or may be implemented together with a related relationship.

Hereinafter, aspects of the present disclosure are described in detail with reference to the drawings. Meanwhile, in the following aspects, the same and like reference numerals are assigned to the same and like components, and detailed descriptions thereof may be omitted.

Figure 2:
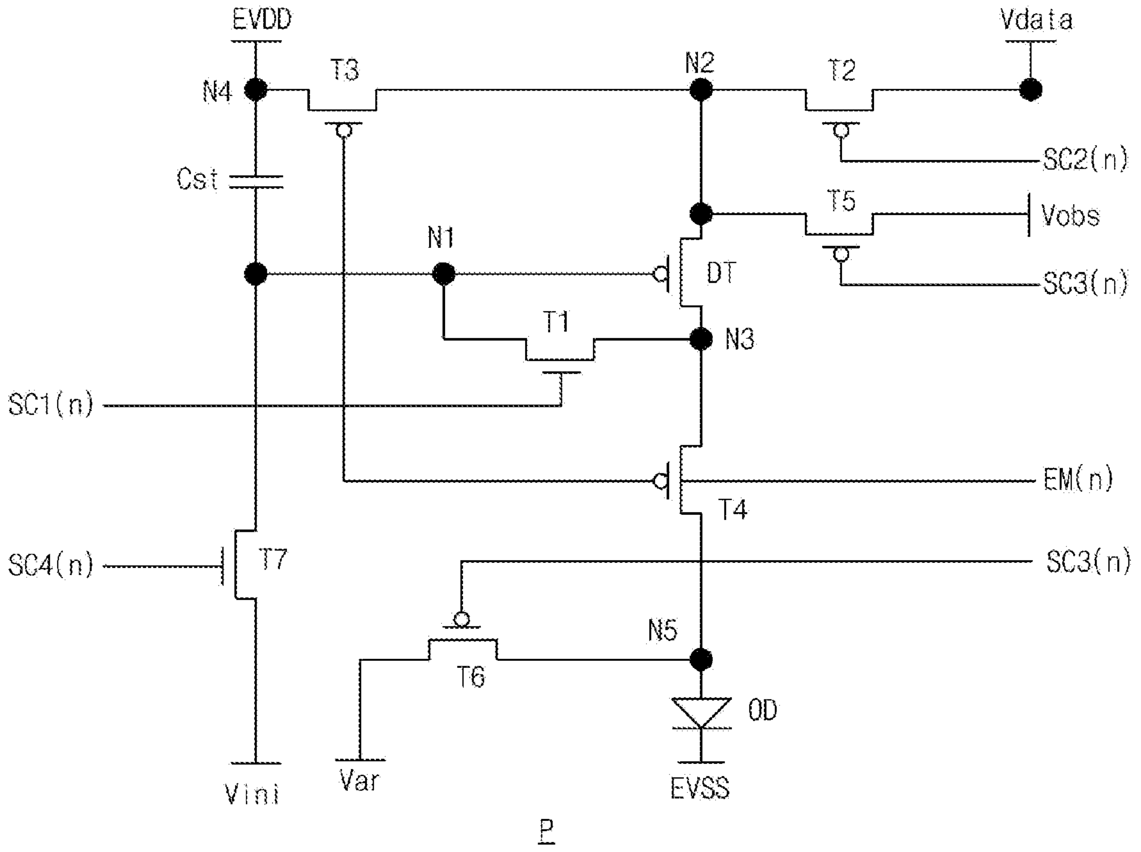
FIG. 2 is a circuit diagram schematically illustrating an example of a pixel according to a first aspect of the present disclosure.
Figure 3:
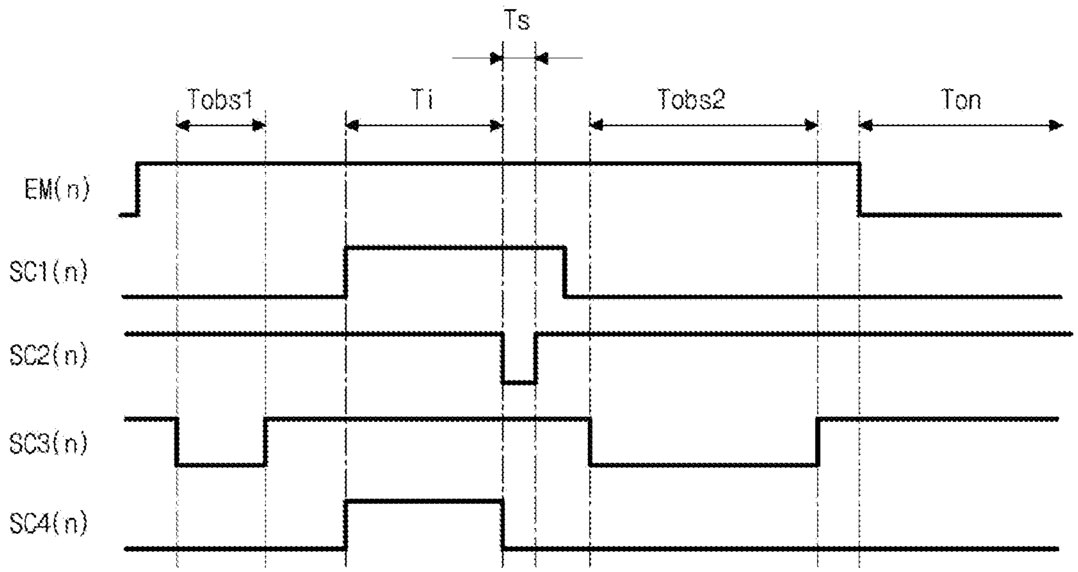
FIG. 3 is a timing diagram schematically illustrating an example of driving signals that drive a pixel of FIG. 2.
Figure 4:
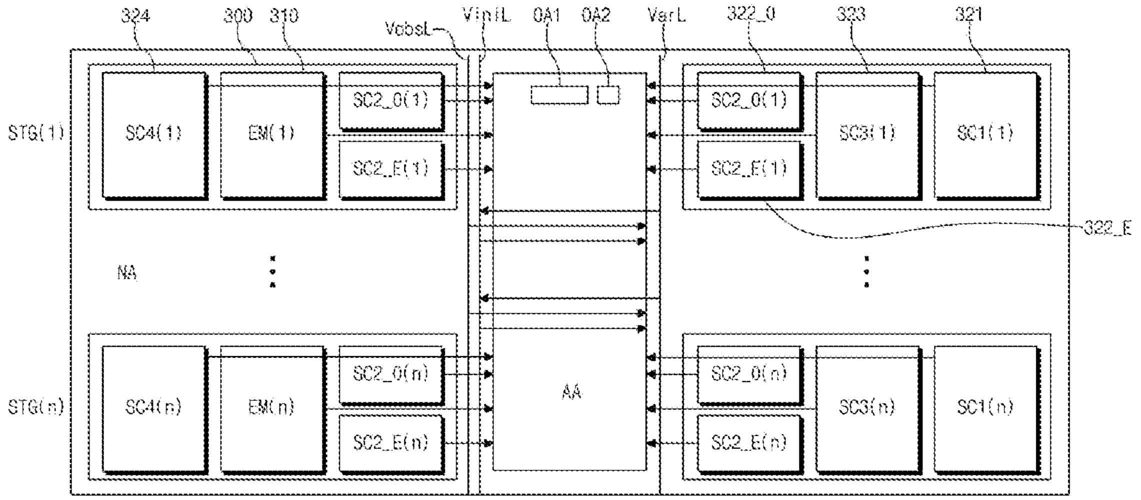
FIG. 4 is a view illustrating a configuration of a gate driving portion of a display device according to a first aspect of the present disclosure.
Figure 5:
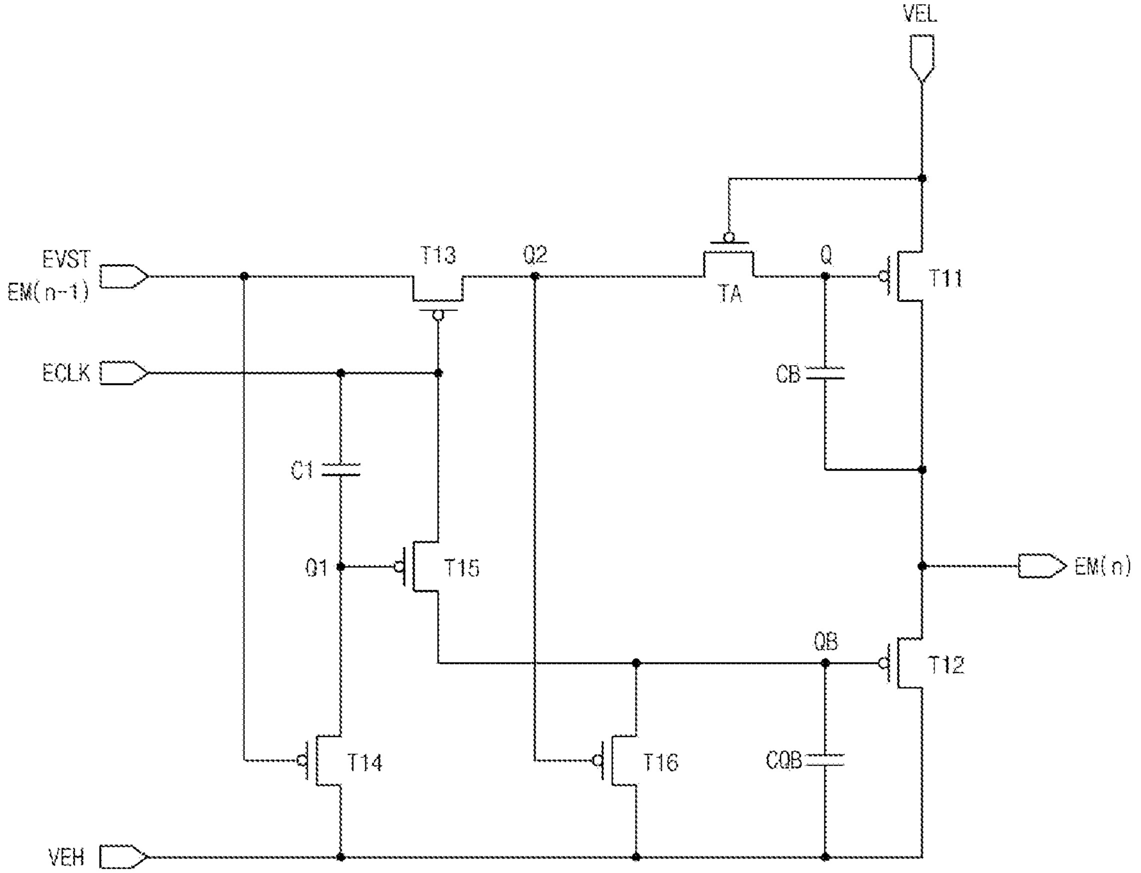
FIG. 5 is a circuit diagram illustrating a configuration of an emission control signal driving portion of a gate driving portion according to a first aspect of the present disclosure.

FIG. 1 is a view schematically illustrating a display device according to a first aspect of the present disclosure. FIG. 2 is a circuit diagram schematically illustrating an example of a pixel according to a first aspect of the present disclosure. FIG. 3 is a timing diagram schematically illustrating an example of driving signals that drive a pixel of FIG. 2. FIG. 4 is a view illustrating a configuration of a gate driving portion of a display device according to a first aspect of the present disclosure. FIG. 5 is a circuit diagram illustrating a configuration of an emission control signal driving portion of a gate driving portion according to a first aspect of the present disclosure.

Prior to a detailed description, the light emitting display device 10 according to this aspect may include all types of light emitting display devices to which a so-called duty driving method is applied in which one frame is divided into a plurality of duty cycles and a light emitting diode is repeatedly turned on/off.

Meanwhile, for convenience of explanation, this aspect describes an organic light emitting display device as the light emitting display device 10 as an example.

Referring to FIGS. 1 and 2, the light emitting display device 10 may include a display panel 100 including a plurality of pixels P, a controller 200, and a gate driving portion 300 that supplies respective gate signals to the plurality of pixels P, a data driving portion 400 that supplies respective data signals to the plurality of pixels P, and a power portion (or power supply portion) 500 that supplies power necessary for driving each of the plurality of pixels P.

The display panel 100 may include a display region (region AA of FIGS. 4 and 6) where the pixels P are located, and a non-display region (region NA of FIGS. 4 and 6) which is arranged to surround the display region AA and in which the gate driving portion 300 and the data driving portion 400 are disposed.

In the display panel 100, a plurality of gate lines GL and a plurality of data lines DL may cross each other, and each of the plurality of pixels P may connected to the corresponding gate line GL and data line DL. Specifically, one pixel P may receive the gate signal from the gate driving portion 300 through the gate line GL, the data signal from the data driving portion 400 through the data line DL, and a high-potential driving voltage EVDD and a low-potential driving voltage EVSS from the power portion 500.

Here, the gate line GL may supply a scan signal SC and an emission control signal EM, and the data line DL may supply a data voltage Vdata. In addition, according to various aspects, the gate line GL may include a plurality of scan lines SCL that supply the scan signals SC and an emission control signal line EL that supplies the emission control signal EM. In addition, the plurality of pixels P may further include power lines VL to receive a bias voltage Vobs and initialization voltages Var and Vini.

In addition, each pixel P may include the light emitting diode (or light emitting element) OD and a pixel circuit that controls a driving of the light emitting diode OD, as shown in FIG. 2.

The pixel circuit may include a plurality of switching elements, a driving element, and a capacitor. Here, the switching elements and driving element may be formed of thin film transistors. In the pixel circuit, the driving element may control an amount of current supplied to the light emitting diode OD according to the data voltage Vdata to adjust an amount of emission of the light emitting diode OD. In addition, the plurality of switching elements may operate the pixel circuit by receiving the scan signals SC supplied through the plurality of scan lines SCL and the emission control signal EM supplied through the emission control signal line EL.

The display panel 100 may be configured as a non-transmissive display panel or a transmissive display panel. A transmissive display panel may be applied to a transparent display device where an image is displayed on a screen and an actual object in a background is visible. The display panel 100 may be manufactured as a flexible display panel.

The pixels P may be divided into a red pixel, a green pixel, and a blue pixel to implement a full color. The pixels P may further include a white pixel. Each of the pixels P includes the pixel circuit as above.

Touch sensors may be disposed on the display panel 100. A touch input may be sensed using separate touch sensors or may be sensed through the pixels P. The touch sensors may be placed on the screen of the display panel 100 as an on-cell type sensors or add-on type sensors, or may be implemented as in-cell type sensors built into the display panel 100.

The controller 200 may process image data RGB input from an outside to suit size and resolution of the display panel 100 and supply them to the data driving portion 400. The controller 200 may use synchronization signals input from the outside, for example, a dot clock signal CLK, a data enable signal DE, a horizontal synchronization signal Hsync, and a vertical synchronization signal Vsync to generate a gate control signal GCS and a data control signal DCS. The controller 200 may supply the generated gate control signal GCS and data control signal DCS to the gate driving portion 300 and the data driving portion 400, respectively, to control the gate driver 300 and the data driver 400.

The controller 200 may be configured by being combined with various processors, for example, a microprocessor, a mobile processor, an application processor, etc., depending on a device on which it is mounted.

A host system may be any one of television (TV) system, set-top box, navigation system, personal computer (PC), home theater system, mobile device, wearable device, and vehicle system.

A voltage level of the gate control signal GCS output from the controller 200 may be converted into a gate-on voltage (or on-voltage) VGL or VEL and a gate-off voltage (or off-voltage) VGH or VEH through a level shifter (not shown) and then be supplied to the gate driving portion 300. The level shifter may convert a low level voltage of the gate control signal GCS into the gate low voltage VGL, and convert a high level voltage of the gate control signal GCS into the gate high voltage VGH. The gate control signal GCS may include a start pulse and a shift clock.

The gate driving portion 300 may supply the scan signal SC to the gate line GL according to the gate control signal GCS from the controller 200. The gate driving portion 300 may be disposed on one or both sides of the display panel 100 in a gate in panel (GIP) structure.

The gate driving portion 300 may sequentially output the gate signals to the plurality of gate lines GL under the control of the controller 200. The gate driving portion 300 may sequentially supply the gate signals to the gate lines GL by shifting the gate signal using a shift register.

The gate signal may include the scan signal SC and the emission control signal EM in the light emitting display device 10. The scan signal SC may include a scan pulse that swings between the gate-on voltage VGL and the gate-off voltage VGH. The emission control signal EM may include an emission control signal pulse that swings between the gate-on voltage VEL and the gate-off voltage VEH.

The scan pulse may be synchronized with the data voltage Vdata and select the pixels P of a line where data are written. The emission control signal EM may define an emission time of the pixels P.

The gate driving portion 300 may include an emission control signal driving portion 310 and at least one scan driving portion 320.

The emission control signal driving portion 310 may output an emission control signal pulse in response to a start pulse and a shift clock from the controller 200, and may sequentially shift the emission control signal pulse according to the shift clock.

At least one scan driving portion 320 may output a scan pulse in response to a start pulse and a shift clock from the controller 200, and may shift the scan pulse according to the shift clock timing.

Hereinafter, the gate driving portion 300 of this aspect is described in more detail with further reference to FIG. 4.

The scan driving portion 320 may be configured with first to fourth scan driving portions 321, 322, 323, and 324. In addition, the second scan driving portion 322 may be configured with an odd second scan driving portion 322_O and an even second scan driving portion 322_E.

The gate driving portion 300 may have shift registers configured symmetrically on both sides of the display region AA. In addition, the shift register on one side of the display region AA may be configured to include the second scan driving portion 322_O and 322_E, the fourth scan driving portion 324, and the emission control signal driving portion 310, and the shift register on the other side of the display region AA may be configured to include the first scan driving portion 321, the second scan driving portion 322_O and 322_E, and the third scan driving portion 323. However, the configuration of the gate driving portion 300 is not limited to this, and the emission control signal driving portion 310 and the first to fourth scan driving portions 321, 322, 323, and 324 may be arranged differently according to aspects.

Stages STG(1) to STG(n) of the shift register may include first scan signal generators SC1(1) to SC1(*n*), second scan signal generators SC2_O(1) to SC2_O(n) and SC2_E(1) to SC2_E(n), third scan signal generators SC3(1)~SC3(*n*), fourth scan signal generators SC4(1)~SC4(*n*), and emission control signal generators EM(1)~EM(n), respectively.

The first scan signal generators SC1(1) to SC1(*n*) may output the first scan signals SC1(1) to SC1(*n*) through the first scan lines of the display panel 100. The second scan signal generators SC2(1) to SC2(*n*) may output the second scan signals SC2(1) to SC2(*n*) through the second scan lines of the display panel 100. The third scan signal generators SC3(1) to SC3(*n*) may output the third scan signals SC3(1) to SC3(*n*) through the third scan lines of the display panel 100. The fourth scan signal generators SC4(1) to SC4(*n*) may output the fourth scan signals SC4(1) to SC4(*n*) through the fourth scan lines of the display panel 100. The emission control signal generators EM(1) to EM(n) may output the emission control signals EM(1) to EM(n) through the emission control signal lines EL of the display panel 100.

The first scan signals SC1(1) to SC1(*n*) may each be used as a signal to drive a transistor (e.g., a compensation transistor, etc.) included in the pixel circuit. The second scan signals SC2(1) to SC2(*n*) may each be used as a signal to drive a B transistor (e.g., a data supply transistor, etc.) included in the pixel circuit. The third scan signals SC3(1) to SC3(*n*) may each be used as a signal to drive a C transistor (e.g., a bias transistor, etc.) included in the pixel circuit. The fourth scan signals SC4(1) to SC4(*n*) may each be used as a signal to drive a D transistor (e.g., an initialization transistor, etc.) included in the pixel circuit. The emission control signals EM(1) to EM(n) may each be used as a signal to drive a E transistor (e.g., an emission control transistor, etc.) included in the pixel circuit. For example, when the emission control transistor of the pixel is controlled using the emission control signals EM(1) to EM(n), the emission time of the light emitting element may be varied.

Referring to FIG. 4, a bias voltage bus line VobsL, a first initialization voltage bus line VarL, and a second initialization voltage bus line ViniL may be disposed between the gate driving portion 300 and the display region AA.

The bias voltage bus line VobsL, the first initialization voltage bus line VarL, and the second initialization voltage bus line ViniL may respectively supply the bias voltage Vobs, the first initialization voltage Var, and the second initialization voltage Vini to the pixel circuit from the power portion 500.

In the drawing, each of the bias voltage bus line VobsL, the first initialization voltage bus line VarL, and the second initialization voltage bus line ViniL are shown as being located only on one side i.e., the left or right side of the display region AA, but not limited thereto, and may be located on both sides, and even if located on one side, the location is not limited to the left or right.

Referring to FIG. 4, one or more optical regions OA1 and OA2 may be disposed in the display region AA.

One or more optical regions OA1 and OA2 may be arranged to overlap one or more optical electronic device, for example, a photographing device such as a camera (or image sensor), and/or a detection sensor such as a proximity sensor or an illuminance sensor. For the operation of the optical electronic device, one or more optical regions OA1 and OA2 may have a light transmittance structure formed therein and have transmittance above a certain level. In other words, a number of pixels P per unit area in one or more optical regions OA1 and OA2 may be smaller than a number of pixels P per unit area in a general region excluding the optical regions OA1 and OA2 in the display region AA. That is, a resolution of one or more optical regions OA1 and OA2 may be lower than a resolution of the general region in the display region AA.

Hereinafter, the emission control signal driving portion 310 of this aspect is described in more detail with further reference to FIG. 5. In FIG. 5, for convenience of explanation, the emission control signal generator EM(n) of the emission control signal driving portion 310 is shown as an example.

The emission control signal generator EM(n) may include a pull-up transistor T11, a pull-down transistor T12, a transfer transistor TA, an eighth transistor T13, a ninth transistor T14, and a tenth transistor T15, an 11th transistor T16, a capacitor CB, a capacitor CQB, and a capacitor C1.

The pull-up transistor T11 may operate to pull-up a voltage of an output terminal in response to a signal of a Q node, and the pull-down transistor T12 may operate to pull-down a voltage of the output terminal in response to a signal of a QB node.

The transfer transistor TA may transfer charges of a Q2 node to the Q node in response to the low-potential voltage VEL.

The eighth transistor T13 may provide a start signal EVST or an output signal EM(n−1) of a previous stage to the Q2 node in response to a clock signal ECLK.

The ninth transistor T14 may transmit the high-potential voltage VEH to a Q1 node in response to the start signal EVST or the output signal EM[n−1] of the previous stage.

The tenth transistor T15 may provide the clock signal ECLK to the QB node in response to a voltage of the Q1 node.

The eleventh transistor T16 may transmit the high-potential voltage VEH to the QB node in response to a voltage of the Q2 node.

The capacitor CB may be connected between the Q node and the output terminal, the capacitor CQB may be connected between the QB node and the high-potential voltage VEH, and the capacitor C1 may be connected between the clock signal ECLK and a drain electrode of the transistor T14 and be connected between the clock signal ECLK and a gate electrode of the tenth transistor T15.

Referring again to FIG. 1, the data driving portion 400 may convert the image data RGB into the data voltages Vdata according to the data control signal DCS supplied from the controller 200, and supply the converted data voltages Vdata to the corresponding pixels P through the data lines DL.

In FIG. 1, the data driving portion 400 is shown as being arranged in a single form on one side of the display panel 100, but number and position of the data driving portion 400 are not limited thereto.

In other words, the data driving portion 400 may be formed of a plurality of integrated circuits (ICs) and may be arranged to be divided into a plurality of units on one side of the display panel 100.

The power portion 500 may use a DC-DC converter to generate direct current (DC) power necessary to drive the pixel array of the display panel 100 and a driving portion of the display panel 100. The DC-DC converter may include a charge pump, a regulator, a buck converter, a boost converter, etc. The power portion 500 may receive a direct current input voltage from a host system (not shown), and generate DC voltages such as the gate-on voltages VGL and VEL, the gate-off voltages VGH and VEH), the high-potential driving voltage EVDD, and the low-potential driving voltage EVSS). The gate-on voltages VGL and VEL and the gate-off voltages VGH and VEH may be supplied to a level shifter (not shown) and the gate driving portion 300. The high-potential driving voltage EVDD and the low-potential driving voltage EVSS may be commonly supplied to the pixels P.

Referring to FIG. 2, the pixel circuit in the pixel P is described.

FIG. 2 only shows a pixel circuit as an example for explanation, and a pixel circuit is not limited as long as its structure may receive the emission control signal EM(n) and control emission of the light emitting diode OD. For example, the pixel circuit may include a switching thin film transistor receiving an additional scan signal, and a switching thin film transistor to which an additional initialization voltage is applied, and a connection relationship of the switching element and a connection position of the capacitor may be made in various ways. Hereinafter, for convenience of explanation, the display device 10 having the pixel circuit structure of FIG. 2 is described.

Referring to FIG. 2, each of the plurality of pixels P may include a pixel circuit having a driving transistor DT and a light emitting diode OD connected to the pixel circuit.

The pixel circuit may control a driving current (or emission current) flowing to the light emitting diode OD to drive the light emitting diode OD. The pixel circuit may include the driving transistor DT, first to seventh transistors T1 to T7, and a capacitor Cst. Each of the transistors DT, and T1 to T7 may include a first electrode, a second electrode, and a gate electrode. One of the first electrode and the second electrode may be a source electrode, and the other of the first electrode and the second electrode may be a drain electrode.

Each of the transistors DT, and T1 to T7 may be a P-type thin film transistor or an N-type thin film transistor. In the aspect of FIG. 2, the first transistor T1 and the seventh transistor T7 are N-type thin film transistors, and the remaining transistors DT, and T2 to T6 are P-type thin film transistors. However, the present disclosure is not limited thereto, and according to aspects, all or part of the transistors DT, and T1 to T7 may be P-type thin film transistors or N-type thin film transistors. In addition, the N-type thin film transistor may be an oxide thin film transistor, and the P-type thin film transistor may be a polycrystalline silicon thin film transistor.

Hereinafter, the first transistor T1 and the seventh transistor T7 configured with N-type thin film transistors, and the remaining transistors DT, and T2 to T6 configured with P-type thin film transistors are explained by way of example. Accordingly, the first transistor T1 and the seventh transistor T7 are turned on by receiving a high voltage, and the remaining transistors DT, and T2 to T6 are turned on by receiving a low voltage.

According to one example, the first transistor T1 may serve as a compensation transistor, the second transistor T2 may serve as a data supply transistor, the third and fourth transistors T3 and T4 may serve as emission control transistor, and the fifth transistor T5 may serve as a bias transistor, and the sixth and seventh transistors T6 and T7 may serve as initialization transistors.

The light emitting diode OD may include an anode electrode and a cathode electrode. The anode electrode of the light emitting diode OD may be connected to a fifth node N5, and the cathode electrode of the light emitting diode OD may be connected to a line supplying the low-potential driving voltage EVSS.

The driving transistor DT may include a first electrode connected to a second node N2, a second electrode connected to a third node N3, and a gate electrode connected to a first node N1. The driving transistor DT may provide a driving current (Id) to the light emitting diode OD based on a voltage of the first node N1 (or a data voltage stored in the capacitor Cst as described later).

The first transistor T1 may include a first electrode connected to the first node N1, a second electrode connected to the third node N3, and a gate electrode that receives the first scan signal SC1(*n*). The first transistor T1 may be turned on in response to the first scan signal SC1(*n*), and form a diode connection between the first node N1 and the third node N3 to sample a threshold voltage (Vth) of the driving transistor DT. The first transistor T1 may be a compensation transistor.

The capacitor Cst may be connected between the first node N1 and a fourth node N4. The capacitor Cst may store or maintain the high-potential driving voltage EVDD provided thereto.

The second transistor T2 may include a first electrode connected to the data line DL (or receiving the data voltage Vdata), a second electrode connected to the second node N2, and a gate electrode that receives the second scan signal SC2(*n*). The second transistor T2 may be turned on in response to the second scan signal SC2(*n*) and transmit the data voltage Vdata to the second node N2. The second transistor T2 may be a data supply transistor.

The third transistor T3 and the fourth transistor T4 (or first and second emission control transistors) may be connected between the high-potential driving voltage EVDD and the light emitting diode OD, and form a current movement path through which the driving current (Id) generated by the driving transistor DT moves.

The third transistor T3 may include a first electrode connected to a fourth node N4 to receive the high-potential driving voltage EVDD, a second electrode connected to the second node N2, and a gate electrode that receives the emission control signal EM(n).

The fourth transistor T4 may include a first electrode connected to the third node N3, a second electrode connected to a fifth node N5 (or the anode electrode of the light emitting diode OD), and a gate electrode that receives the emission control signal EM(n).

The third and fourth transistors T3 and T4 may be turned on in response to the emission control signal EM(n), and in this case, the driving current (Id) may be provided to the light emitting diode OD, and the light emitting diode OD may emit light with luminance corresponding to the driving current (Id).

The fifth transistor T5 may include a first electrode receiving the bias voltage Vobs, a second electrode connected to the second node N2, and a gate electrode receiving the third scan signal SC3(*n*). The fifth transistor T5 may be a bias transistor.

The sixth transistor T6 may include a first electrode receiving the first initialization voltage Var, a second electrode connected to the fifth node N5, and a gate electrode receiving the third scan signal SC3(*n*).

The sixth transistor T6 may be turned on in response to the third scan signal SC3(*n*) before emission of the light emitting diode OD (or after emission of the light emitting diode OD), and may initialize the anode electrode of the light emitting diode OD using the first initialization voltage Var. In this regard, the light emitting diode OD may have a parasitic capacitor formed between the anode electrode and the cathode electrode. While the light emitting diode OD emits light, the parasitic capacitor may be charged so that the anode electrode of the light emitting diode OD may have a certain voltage. Accordingly, by applying the first initialization voltage Var to the anode electrode of the light emitting diode OD through the sixth transistor T6, an amount of charges accumulated in the light emitting diode OD may be initialized.

In this aspect, the gate electrodes of the fifth and sixth transistors T5 and T6 may be configured to commonly receive the third scan signal SC3(*n*). However, the present disclosure is not necessarily limited to this, and the gate electrodes of the fifth and sixth transistors T5 and T6 may be configured to be independently controlled by receiving separate scan signals.

The seventh transistor T7 may include a first electrode receiving the second initialization voltage Vini, a second electrode connected to the first node N1, and a gate electrode receiving the fourth scan signal SC4(*n*).

The seventh transistor T7 may be turned on in response to the fourth scan signal SC4(*n*), and may initialize the gate electrode of the driving transistor DT using the second initialization voltage Vini. Unnecessary charges may remain in the gate electrode of the driving transistor (DT) due to the high-potential driving voltage EVDD stored in the capacitor Cst. Accordingly, by applying the second initialization voltage Vini to the gate electrode of the driving transistor DT through the seventh transistor T7, an amount of the remaining charges may be initialized.

The operation of the above pixel circuit and light emitting diode OD is described with further reference to FIG. 3.

In each frame, the pixel P may operate with at least one bias period Tobs1 and Tobs2, an initialization period Ti, a sampling period Ts, and an emission period Ton, but this is one aspect and the present disclosure is not necessarily bound to this order.

At least one bias period Tobs1 and Tobs2 may be a period when an on-bias stress (OBS) operation with the bias voltage Vobs being applied is performed. In the bias period Tobs1 and Tobs2, the emission control signal EM(n) has a high voltage, and the third and third transistors T3 and T4 are turned off. The first scan signal SC1(*n*) and the fourth scan signal SC4(*n*) has low voltages, and the first transistor T1 and the seventh transistor T7 are turned off. The second scan signal SC2 has a high voltage and the second transistor T2 is turned off.

The third scan signal SC3(*n*) is input as a low voltage, and the fifth and sixth transistors T5 and T6 are turned on. As the fifth transistor T5 is turned on, the bias voltage Vobs is applied to the first electrode of the driving transistor DT connected to the second node N2.

Here, the bias voltage Vobs is supplied to the third node N3 that is the drain electrode of the driving transistor DT, so that a charging time or charging delay of the voltage of the fifth node N5, which is the anode electrode of the light emitting diode OD, in the emission period Ton may be reduced. The driving transistor DT maintains a stronger saturation state.

For example, as the bias voltage Vobs increases, the voltage of the third node N3 that is the drain electrode of the driving transistor DT may increase, and the gate-source voltage or drain-source voltage of the driving transistor DT may decrease. Thus, the bias voltage Vobs may be at least greater than the data voltage Vdata.

At this time, a magnitude of the drain-source current Id passing through the driving transistor DT may be reduced, and a stress of the driving transistor DT may be reduced in a positive bias stress situation, thereby resolving the charging delay of the voltage of the third node N3. In other words, performing the on-bias stress (OBS) operation before sampling the threshold voltage (Vth) of the driving transistor DT may alleviate a hysteresis of the driving transistor DT.

The initialization period Ti may be a period for initializing the voltage of the gate electrode of the driving transistor DT.

The first scan signal SC1(*n*) to the fourth scan signal SC4(*n*) and the emission control signal EM(n) have high voltages, and the first transistor T1 and the seventh transistor T7 are turned on. The second to sixth transistors T2 to T6 are turned off. As the first and seventh transistors T1 and T7 are turned on, the gate electrode and second electrode of the driving transistor DT connected to the first node N1 are initialized to the second initialization voltage Vini.

The sampling period may be a period that samples the threshold voltage (Vth) of the driving transistor DT.

The first scan signal SC1(*n*), the third scan signal SC3(*n*), and the emission control signal EM(n) have high voltages, and the second scan signal SC2(*n*) and the fourth scan signal SC4(*n*) have low voltages. Accordingly, the third to seventh transistors T3 to T7 are turned off, the first transistor T1 remains on, and the second transistor T2 is turned on. In other words, the second transistor T2 is turned on, so the data voltage Vdata is applied to the driving transistor DT, and the first transistor T1 forms a diode connection between the first node N1 and the third node N3, so the threshold voltage (Vth) of the driving transistor DT may be sampled.

The emission period Ton may be a period when the sampled threshold voltage (Vth) is offset and the light emitting diode OD emits light with the driving current (Id) corresponding to the sampled data voltage Vdata.

The emission control signal EM(n) has a low voltage, and the third and fourth transistors T3 and T4 are turned on.

As the third transistor T3 is turned on, the high-potential driving voltage EVDD supplied to the fourth node N4 is applied to the first electrode of the driving transistor DT connected to the second node N2 through the third transistor T3. The driving current (Id) supplied from the driving transistor DT to the light emitting diode OD via the fourth transistor T4 becomes independent of the value of the threshold voltage (Vth) of the driving transistor DT, so that the threshold voltage (Vth) of the driving transistor DT is compensated and operates.

Figure 6:
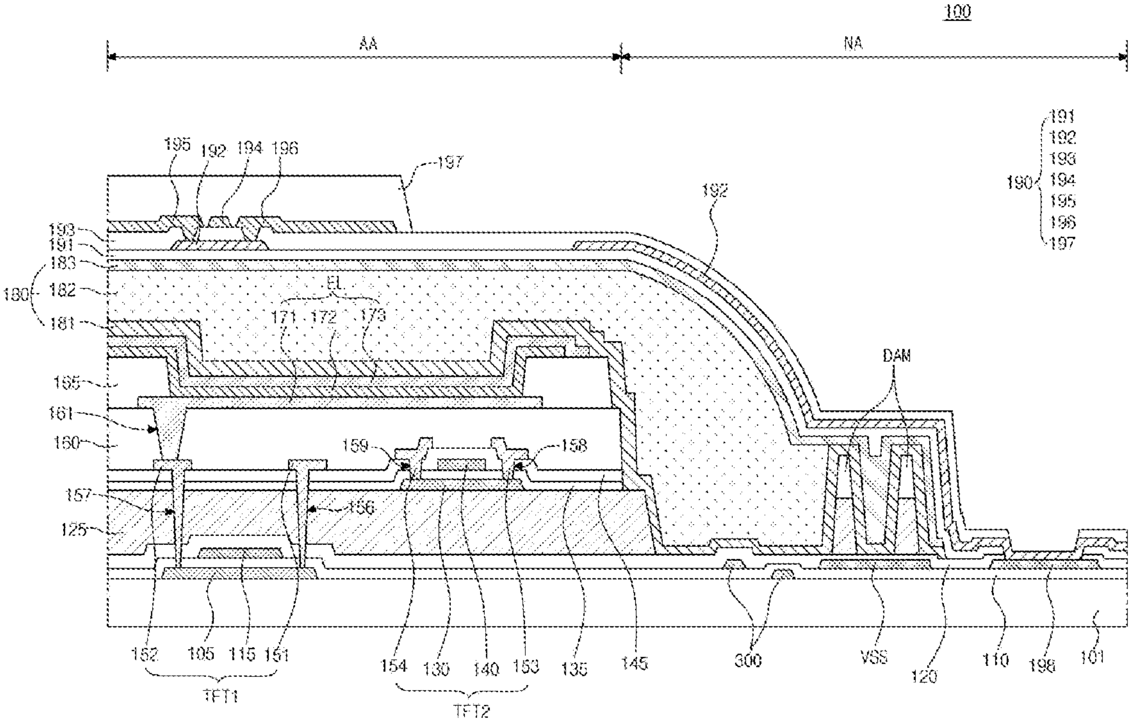
FIG. 6 is a cross-sectional view schematically illustrating an example of a cross-sectional structure of a display panel according to a first aspect of the present disclosure.

Hereinafter, an example of a cross-sectional structure of the display panel 100 of this aspect is described with further reference to FIG. 6. FIG. 6 is a cross-sectional view schematically illustrating an example of a cross-sectional structure of a display panel according to a first aspect of the present disclosure.

In FIG. 6, for convenience of explanation, two thin film transistors TFT1 and TFT2 are shown in the pixel P in the display region AA. Here, the thin film transistor TFT1 located relatively lower and close to the substrate 101 is referred to as a first thin film transistor TFT1, which may be a polycrystalline silicon thin film transistor. The thin film transistor TFT2 located relatively upper and far from the substrate 101 is referred to as a second thin film transistor TFT2, which may be an oxide thin film transistor.

Meanwhile, in this aspect, a case where the first thin film transistor TFT1 is a driving transistor (DT of FIG. 2) is taken as an example. Further, a case where the second thin film transistor TFT2 is one of the first to seventh transistors (T1 to T7 of FIG. 2) that are switching thin film transistors, more specifically, a transistor connected to the capacitor Cst is taken as an example.

The first thin film transistor TFT1 may include a first semiconductor layer 105 disposed on the substrate 101, a first gate electrode 115 that overlaps the semiconductor layer 105 with a first insulating layer 110 interposed therebetween, and a first source electrode 151 and a first drain electrode 152 located on a fourth insulating layer 145 over the first gate electrode 115. Here, the first semiconductor layer 115 may be formed of polycrystalline silicon, but not limited thereto.

The first semiconductor layer 105 may include a central channel region and source and drain regions on both sides. The first source electrode 151 and the first drain electrode 152 may be connected to the source region and the drain region of the first semiconductor layer 105 through first and second contact holes 156 and 157 that are formed in the insulating layers 110, 120, 125, 135, and 145 located below the first source and drain electrodes 151 and 152.

A second insulating layer 120 may be formed on the first gate electrode 115 of the first thin film transistor TFT1.

A first interlayered insulating layer 125 may be formed on the second insulating layer 120. The second thin film transistor TFT2 may be formed on the first interlayered insulating layer 125.

The second thin film transistor TFT2 may include a second semiconductor layer 130 on the first interlayered insulating layer 125, a second gate electrode 140 that overlaps the second semiconductor layer 130 with a third insulating layer 135 interposed therebetween, and a second source electrode 153 and a second drain electrode 154 located on the fourth insulating layer 145 over the second gate electrode 140. Here, the second semiconductor layer 115 may be formed of an oxide semiconductor, but not limited thereto.

The second semiconductor layer 130 may include a central channel region and source and drain regions on both sides. The second source electrode 153 and the second drain electrode 154 may be connected to the source region and the drain region of the second semiconductor layer 130 through third and fourth contact holes 158 and 159 formed in the insulating layers 135 and 145 located below the second source and drain electrodes 153 and 154.

A second interlayered insulating layer 160 may be formed on the second thin film transistor TFT2.

Here, the first, second, third, and fourth insulating layers 110, 120, 135, and 145 may be made of an inorganic insulating material such as silicon nitride or silicon oxide, but not limited thereto.

In addition, the first and second interlayered insulating layers 125 and 160 may be made of an organic insulating material such as photo acrylic or benzocyclobutene, but not limited thereto.

The light emitting diode OD and a bank layer 165 may be formed on the second interlayered insulating layer 160.

The light emitting diode OD may include an anode electrode (or first electrode) 171, a light emitting layer 172, and a cathode electrode (or second electrode) 173.

The anode electrode 171 may be connected to the first drain electrode 152 through the contact hole 161 formed in the second interlayered insulating layer 160.

The bank layer 165 may be disposed along a boundary of the pixel P and may be formed to cover an edge of the anode electrode 171. The light emitting layer 172 may be formed on the anode electrode 171 exposed through an opening of the bank layer 165.

The cathode electrode 173 may be formed on the light emitting layer 172 and may be applied with the low-potential driving voltage (EVSS of FIG. 2).

An encapsulation layer 180 may be formed on the cathode electrode 173. The encapsulation layer 180 may include at least one inorganic encapsulation layer and at least one organic encapsulation layer, but not limited thereto. In the present disclosure, a structure of the encapsulation layer 180, in which the first encapsulation layer 181, the second encapsulation layer 182, and the third encapsulation layer 183 are sequentially stacked, is described as an example.

The first encapsulation layer 181 may be formed on the substrate 101 on which the cathode electrode 173 is formed. The third encapsulation layer 183 may be formed on the substrate 101 on which the second encapsulation layer 182 is formed, and may be configured to surround top, bottom, and side surfaces of the second encapsulation layer 182 together with the first encapsulation layer 181. The first encapsulation layer 181 and the third encapsulation layer 183 may minimize or prevent external moisture or oxygen from penetrating into the light emitting diode OD. The first encapsulation layer 181 and the third encapsulation layer 183 may be formed of an inorganic insulating material capable of low-temperature deposition, such as silicon nitride, silicon oxide, silicon oxynitride, or aluminum oxide.

The second encapsulation layer 182 may serve as a buffer to relieve stress between layers due to bending of the display device (10 of FIG. 1), and may flatten steps between layers. The second encapsulation layer 182 may be formed on the substrate 101 on which the first encapsulation layer 181 is formed, using a non-photosensitive organic insulating material such as acrylic resin, epoxy resin, phenolic resin, polyamide resin, polyimide resin, polyethylene, and silicon oxycarbon (SiOC), or a photosensitive organic insulating material such as photo acrylic, but not limited thereto. When the second encapsulation layer 182 is formed through an inkjet method, a dam DAM may be formed in the non-display region NA to prevent the second encapsulation layer 182 in liquid form from spreading to an edge of the substrate 101. The dam DAM may be disposed closer to the edge of the substrate 101 than the second encapsulation layer 182. The dam DAM may prevent the second encapsulation layer 182 from spreading into a pad region, where a conductive pad is disposed, on an outermost side of the substrate 101.

The dam DAM is configured to prevent the spreading of the second encapsulation layer 182, but if the second encapsulation layer 182 is formed to exceed a height of the dam DAM during a process, the second encapsulation layer 182 as an organic layer may be exposed to an outside, so moisture, etc. may easily penetrate into the light emitting element. To prevent this, at least 10 or more dams DAMs may be formed.

The dam DAM may be formed simultaneously with the first interlayered insulating layer 125 and the second interlayered insulating layer 160. When forming the first interlayered insulating layer 125, a lower layer of the dam DAM may be formed together, and when forming the second interlayered insulating layer 160, an upper layer of the dam DAM is formed together, so that the dame DAM may be formed in a double laminated structure.

Accordingly, the dam DAM may be formed of the same materials as the first interlayered insulating layer 125 and the second interlayered insulating layer 160, but not limited thereto.

The dam DAM may be formed to overlap a low-potential driving power line VSS. For example, the low-potential driving power line VSS may be formed at a lower layer of a region, where the dam DAM is located, in the non-display area NA.

The low-potential driving power line VSS and the gate driving portion 300 configured in a gate in panel (GIP) structure may be formed to surround a periphery of the display panel 100, and the low-potential driving power line VSS may be located outside the gate driving portion 300. In addition, the low-potential driving power line VSS may be connected to the cathode electrode 173 to supply the low-potential driving voltage (EVSS of FIG. 2). The gate driving portion 300 is simply shown in the plan and cross-sectional drawings, but may have the same structure as the first and/or second thin film transistor TFT1 and/or TFT2 in the display region AA.

A touch layer 190 may be disposed on the encapsulation layer 180. In the touch layer 190, a touch buffer layer 191 may be located between a touch sensor metal including touch electrode connection lines 192 and 194 and touch electrodes 195 and 196, and the cathode electrode 173 of the light emitting diode OD.

The touch buffer layer 191 may prevent a chemical solution (e.g., developer, etchant, etc.) used during a manufacturing process of the touch sensor metal disposed on the touch buffer layer 191 or moisture from the outside from penetrating into the light emitting layer 172 containing an organic material. Accordingly, the touch buffer layer 191 may prevent damage to the light emitting layer 172 which is vulnerable to the chemical solution or moisture.

According to a mutual-capacitance-based touch sensor structure, the touch electrodes 195 and 196 may be disposed on the touch buffer layer 191, and the touch electrodes 195 and 196 may be disposed to cross each other.

The touch electrode connection lines 192 and 194 may electrically connect the touch electrodes 195 and 196. The touch electrode connection lines 192 and 194 and the touch electrodes 195 and 196 may be located at different layers with a touch insulating layer 193 interposed therebetween.

The touch electrode connection lines 192 and 194 may be arranged to overlap the bank layer 165, thereby preventing a decrease in aperture ratio.

Meanwhile, the touch electrodes 195 and 196 may be electrically connected to a touch driving circuit (not shown) through a portion of the touch electrode connection line 192 which extends along the top and side surfaces of the encapsulation layer 180 and the top and side surfaces of the dam DAM and is connected to the touch pad 198.

The portion of the touch electrode connection line 192 may receive a touch driving signal from the touch driving circuit and transmit it to the touch electrodes 195 and 196, and may transmit a touch sensing signal from the touch electrodes 195 and 196 to the touch driving circuit.

A touch protective layer 197 may be disposed on the touch electrodes 195 and 196. In the drawing, the touch protective layer 197 is shown as being disposed only on the touch electrodes 195 and 196, but not limited thereto, and the touch protective layer 197 may extend before or after the dam DAM to be disposed on the touch electrode connection line 192.

In addition, a color filter (not shown) may be disposed over the encapsulation layer 180. The color filter may be located on the touch layer 190, or between the encapsulation layer 180 and the touch layer 190.

Hereinafter, duty driving of the display device according to the first aspect of the present disclosure is described in detail.

Figure 7:
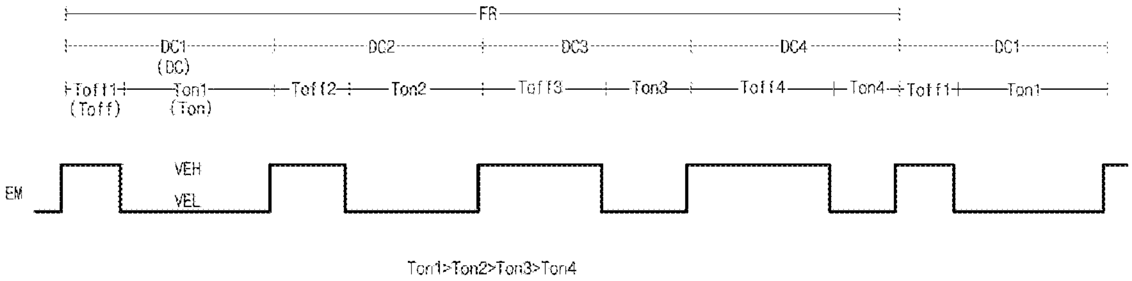
FIG. 7 is a view schematically illustrating an example of an emission control signal that implements a duty driving according to a first aspect of the present disclosure.

FIG. 7 is a view schematically illustrating an example of an emission control signal that implements a duty driving according to a first aspect of the present disclosure.

Referring to FIG. 7 along with FIGS. 1 to 6, each frame FR may be divided into a plurality of duty cycles DC as a plurality of (or K) sections. In this aspect, for convenience of explanation, a case where each frame FR includes four sections i.e., a first section having a first duty cycle DC1 to a fourth section having a fourth duty cycle DC4 is taken as an example. In an aspect, the first to fourth sections may have the same time duration. However, the present disclosure is not limited to it.

Here, the first to fourth duty cycles DC1 to DC4 may be defined (or arranged) according to time order.

In each duty cycle DC, an on-duty period (or on period) Ton which is an emission period of the light emitting diode OD, and an off-duty period (or off period) Toff which is a non-emission period of the light emitting diode OD may be defined (or set).

Here, in this aspect, a case where the on-duty period Ton follows (or is placed after) the off-duty period Toff in each duty cycle DC is taken as an example. Meanwhile, a data writing operation for the pixel P may be performed in the off-duty period Toff1 of the first duty cycle DC1 at the beginning of the frame FR.

As such, each frame FR is divided into the plurality of duty cycles DC, and each duty cycle DC has the on/off duty periods Ton/Toff, so that the light emitting diode OD may be configured to be repeatedly turned on/off in according to duty cycle DC in each frame FR.

Meanwhile, a length (or time) of each of the plurality of duty cycles DC (i.e., the first to fourth duty cycles DC1 to DC4 may be set to be the same, but not limited thereto.

Meanwhile, in this aspect, the on-duty periods Ton of the first to fourth duty cycles DC1 to DC4 i.e., the first to fourth on-duty periods Ton1 to Ton4 may be configured to be different (or differentiated) from each other.

In this regard, for example, an on-duty ratio may be configured to decrease in the order from the first duty cycle DC1 to the fourth duty cycle DC4.

In other words, within the frame FR, it may be configured that the first on-duty period Ton1 of the first duty cycle DC1 is the longest, the second on-duty period Ton2 of the second duty cycle DC2 is the second longest, the third on-duty period Ton3 of the third duty cycle DC3 is the third longest, and the fourth on-duty period Ton4 of the fourth duty cycle DC4 is the shortest. In other words, a relationship, Ton1>Ton2>Ton3>Ton4 may be established.

As the length of the on-duty period Ton is set in this way, an off-duty ratio may be configured to increase in the order of the first duty cycle DC1 to the fourth duty cycle DC4.

In other words, within the frame FR, it may be configured that the first off-duty period Toff1 of the first duty cycle DC1 is the shortest, the second off-duty period Toff2 of the second duty cycle DC2 is the second shortest, the third off-duty period Toff3 of the third duty cycle DC3 is the third shortest, and the fourth off-duty period Toff4 of the fourth duty cycle DC4 is the longest. In other words, a relationship, Toff1<Toff2<Toff3<Toff4 may be established.

As such, in this aspect, within one frame FR, the on-duty period Ton may be configured to be differentiated in a gradually decreasing manner.

Such the differentiation of the on-duty period Ton may be implemented by the emission control signal EM.

In this regard, the emission control signal EM of a period corresponding to each frame FR may have a waveform corresponding to the on/off duty periods Ton/Toff of the duty cycles DC of the frame FR.

In this regard, the emission control signal EM may be configured such that its turn-on voltage (or gate-on voltage) (e.g., low voltage) and its turn-off voltage (or gate-off voltage) (e.g., high voltage) alternate repeatedly to correspond to the on/off duty periods Ton/Toff within the frame FR.

For example, the emission control signal EM may have the turn-on voltage/turn-off voltage VEL/VEH corresponding to the first on/off-duty periods Ton1/Toff1 in the first duty cycle DC1. In addition, the emission control signal EM may have the turn-on voltage/turn-off voltage VEL/VEH corresponding to the second on/off-duty periods Ton2/Toff2 in the second duty cycle DC2. In addition, the emission control signal EM may have the turn-on voltage/turn-off voltage VEL/VEH corresponding to the third on/off-duty periods Ton3/Toff3 in the third duty cycle DC3. In addition, the emission control signal EM may have the turn-on/turn-off voltage VEL/VEH corresponding to the fourth on/off-duty periods Ton4/Toff4 in the fourth duty cycle DC4.

As such, the waveform of the emission control signal EM may be generated to reflect the on/off-duty periods Ton/Toff of the first to fourth duty cycles DC1 to DC4.

As above, by performing the emission on-duty differentiation in such a way that the on-duty period Ton decreases from the initial section to the late section (or end section) of the frame FR, a flicker that occurs when switching frames in displaying a low-luminance image may be effectively improved.

In this regard, in the case of a low-luminance image, a small amount of emission current flows, so a charging of the anode electrode 171 of the light emitting diode OD is slowed down in an initial section of the frame FR. Accordingly, in the duty driving, if the on-duty periods of all duty cycles is set to be the same, light may not be emitted normally during the duty cycle at the beginning of the frame FR. Further as time passes, in the late duty cycle, the charging of the anode electrode 171 becomes normal and light may be emitted normally.

As such, in the case of a low-luminance image, within each frame FR, there is a luminance waveform in which a luminance is very low in the initial duty cycle and increases as it goes backwards.

Accordingly, when switching the frames FR, a flicker may be perceived due to a difference between the relatively high luminance of the last duty cycle of the previous frame and the relatively low luminance of the first duty cycle of the current frame.

On the other hand, according to this aspect, the emission time is differentiated in such a way that the on-duty period Ton of the duty cycle DC decreases as it goes from the initial section to the late section of the frame FR.

Accordingly, within each frame FR, the duty cycle DC of the initial section, for example, the on-duty period Ton1 of the first duty cycle DC1 is relatively increased, so that the charging amount of the anode electrode 171 of the light emitting diode OD is increased, and the luminance may be increased.

In addition, the duty cycle DC of the latter section, for example, the on-duty period Ton4 of the fourth duty cycle DC4 is relatively reduced, so that the charging amount of the anode electrode 171 of the light emitting diode OD is reduced, the luminance may be lowered.

As such, in the on-duty differentiation driving of this aspect, the luminance difference between the first duty cycle DC1 and the last duty cycle DC4 may be reduced.

Therefore, when switching the frames FR, the difference between the luminance of the last duty cycle DC4 of the previous frame and the luminance of the first duty cycle DC1 of the current frame may be reduced, so it is possible to effectively improve the occurrence of flicker during the frame transition of the low-luminance image.

Figure 8:
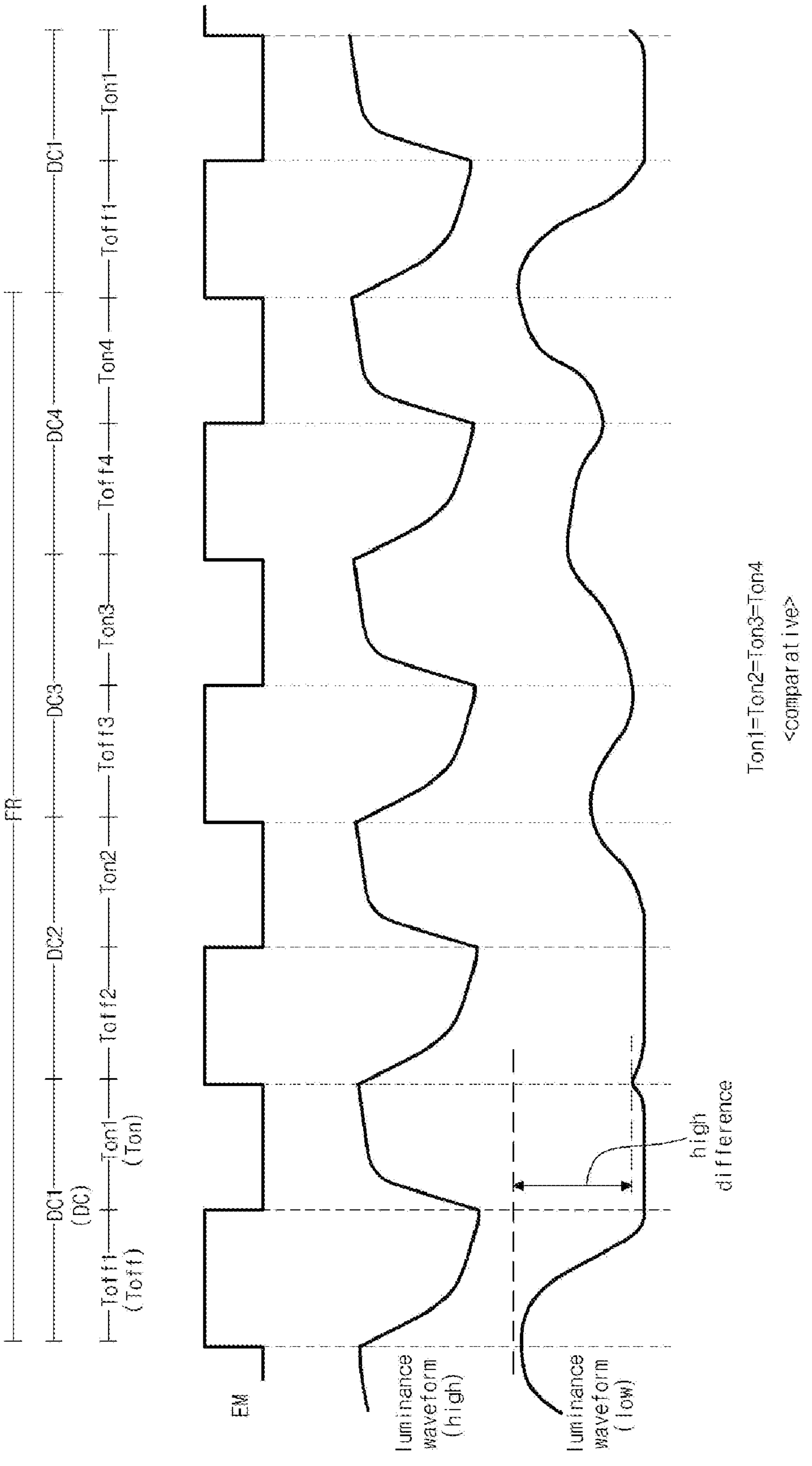
FIG. 8 is a view illustrating a simulation result of a luminance waveform of a light emitting display device of a comparative example.
Figure 9:
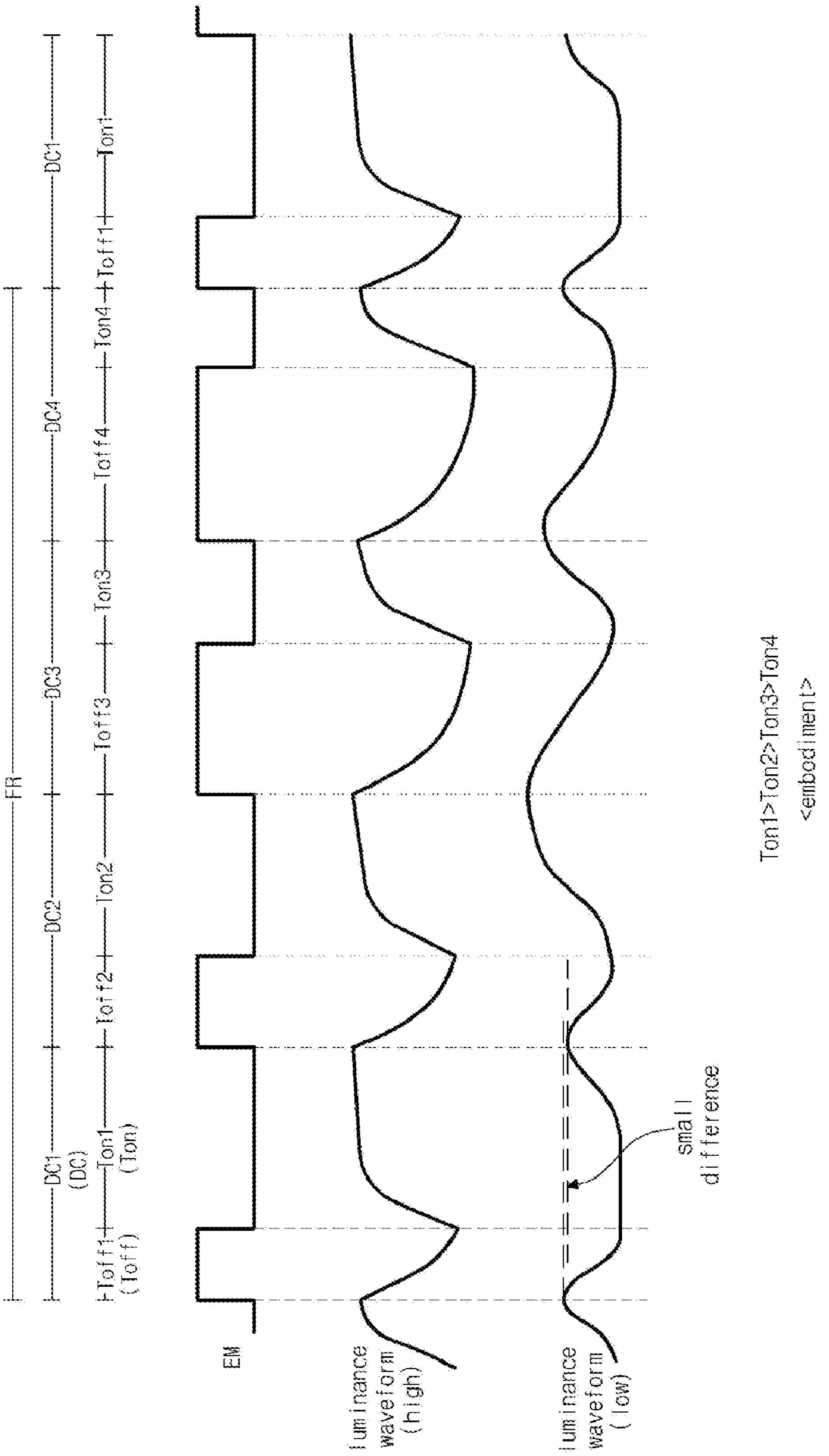
FIG. 9 is a view illustrating a simulation result of a luminance waveform of a light emitting display device according to a first aspect of the present disclosure.

FIG. 8 is a view illustrating a simulation result of a luminance waveform of a light emitting display device of a comparative example, and FIG. 9 is a view illustrating a simulation result of a luminance waveform of a light emitting display device according to a first aspect of the present disclosure.

The comparative example of FIG. 8 shows a display device that performs an equalization driving in which all duty cycles DC of each frame FR have the same on-duty period.

In the light emitting display device of the comparative example, it may be seen that for a high-luminance (e.g., 480 nit) image, a luminance becomes uniform as the duty cycles DC progress within the frame FR. Therefore, for the high-luminance image, no substantial difference in luminance occurs when switching the frames FR, so a flicker is not perceived.

However, in the light emitting display device of the comparative example, it may be seen that for a low-luminance (e.g., 0.9 nit) image, a luminance is very low, approaching 0, at the initial duty cycle DC within the frame FR, and a luminance increases over time.

Accordingly, in the comparative example, when switching frames FR of the low-luminance image, the luminance of the last duty cycle DC4 of the previous frame is very high and the luminance of the initial duty cycle DC1 of the current frame is very low, so the luminance difference between them is very high, and a flicker may occur.

Meanwhile, referring to FIG. 9, in the light emitting display device of aspect according to the present application, it may be seen that for a high-luminance (e. g., 480 nit) image, a luminance becomes uniform as the duty cycles DC progress within the frame (FR), similar to the comparative example. Therefore, for the high-luminance image, no substantial difference in luminance occurs when switching the frames FR, so a flicker is not perceived.

In addition, in the light emitting display device of this aspect, it may be seen that for a low-luminance (e.g., 0.9 nit) image, unlike the comparative example, a certain level of luminance is generated at the initial duty cycle DC1 within the frame FR, and a substantially uniform level of luminance is generated in the remaining duty cycles DC2 to DC4, so a deviation of luminance distribution is significantly reduced compared to the comparative example.

Accordingly, in this aspect, when switching the frames FR of the low-luminance image, the luminance of the last duty cycle DC4 of the previous frame is lowered and the luminance of the initial duty cycle DC1 of the current frame is increased, so the luminance difference between them is smaller, and a flicker may be prevented.

Figure 10:
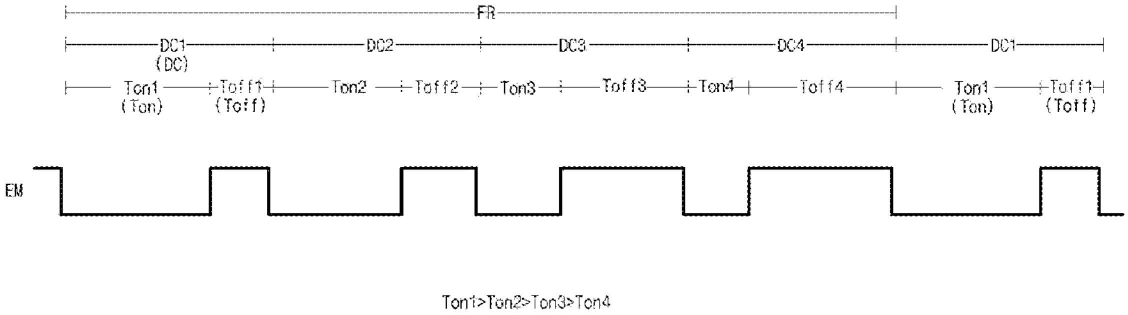
FIG. 10 is a view illustrating another example of an emission control signal that implements a duty driving according to a first aspect of the present disclosure.

FIG. 10 is a view illustrating another example of an emission control signal that implements a duty driving according to a first aspect of the present disclosure.

Referring to FIG. 10, unlike the example of FIG. 7 described above, the on-duty period Ton may be configured to precede the off-duty period Toff in each duty cycle (DC).

In this case as well, the on-duty period Ton may be configured to be differentiated in a sequentially decreasing manner in each frame FR.

Figure 11:
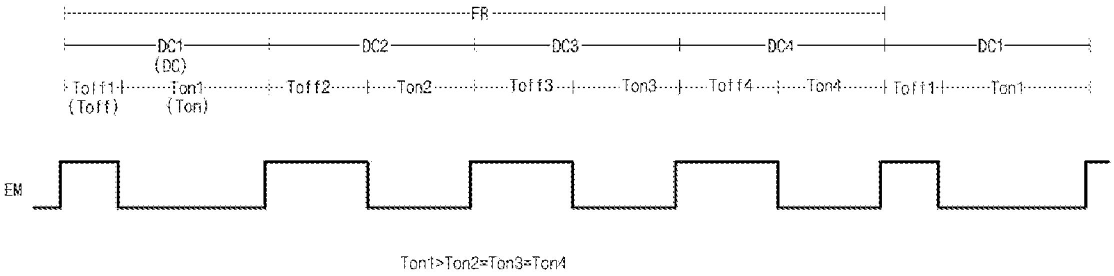
FIG. 11 is a view schematically illustrating an example of an emission control signal that implements a duty driving of a light emitting display device according to a second aspect of the present disclosure.

FIG. 11 is a view schematically illustrating an example of an emission control signal that implements a duty driving of a light emitting display device according to a second aspect of the present disclosure.

In the following description, detailed explanations of configurations identical or similar to those of the above-described first aspect may be omitted.

Referring to FIG. 11, in the light emitting display device of this aspect, in differentiating the on-duty periods Ton, the on-duty period Ton1 of the first duty cycle DC1 at the beginning of the frame FR may be set to the longest, the on-duty periods Ton2 to Ton4 of the remaining duty cycles DC2 to DC4 may be set the same. In other words, a relationship, Ton1>Ton2=Ton3=Ton4 may be established.

The emission control signal EM may have a waveform corresponding to the on/off-duty periods Ton/Toff of the frame FR.

Even if a differentiation (or partial differentiation) driving of the on-duty period DC is performed as described above, a luminance difference is reduced when switching the frames FR of a low-luminance image, so that a flicker may be alleviated.

In this regard, the first on-duty period Ton1 at the beginning of the frame FR is set to be the longest, so that the on-duty period Ton1 of the initial first duty cycle DC1 within each frame FR is relatively increased, and the luminance may be increased.

In addition, in the fourth duty cycle DC at the end of the frame FR, the on-duty period Ton4 is relatively reduced, so the luminance may be lowered.

As such, in the on-duty differentiation driving of this aspect, the luminance difference between the first duty cycle DC1 at the beginning and the fourth duty cycle DC4 at the end may be reduced.

Therefore, when switching the frames FR of the low-luminance image, the difference between the luminance of the last duty cycle DC4 of the previous frame and the luminance of the first duty cycle DC1 of the current frame may be reduced, thereby reducing occurrence of flicker due to the luminance difference.

As described in the above aspects, the on-duty period Ton1 of the initial duty cycle DC1 within the frame FR may be set to be the longest.

Accordingly, when displaying a low-luminance image, the luminance may be increased at the duty cycle DC1 at the beginning of the frame FR, so the luminance difference from the duty cycle DC4 at the end of the frame FR may be reduced. As a result, it is possible to alleviate a flicker caused by luminance difference when switching the frames FR of the low-luminance image.

Meanwhile, the types of on-duty period differentiation in the above-described aspects are examples of the present disclosure, and other types of on-duty period differentiation are also possible.

In this regard, for example, the on-duty period Ton1 of the first duty cycle DC1 is the longest, and the on-duty periods Ton2 to Ton4 of the remaining second to fourth duty cycles DC2 to DC4 may increase over time.

As another example, the on-duty period Ton1 of the first duty cycle DC1 is the longest, and some of the on-duty periods Ton2 to Ton4 of the remaining second to fourth duty cycles DC2 to DC4 may be the same (e.g., Ton2=Ton3, or Ton2=Ton4, or Ton3=Ton4).

As another example, the on-duty period Ton1 of the first duty cycle DC1 is the longest, and the on-duty periods Ton2 to Ton4 of the remaining second to fourth duty cycles DC2 to DC4 may be different without sequentially decreasing or increasing (e.g., Ton2>Ton4>Ton3, or Ton3>Ton2>Ton4, etc.).

It will be apparent to those skilled in the art that various modifications and variation may be made in the present disclosure without departing from the spirit or scope of the disclosure. Thus, it is intended that the present disclosure cover the modifications and variations of this disclosure provided they come within the scope of the appended claims and their equivalents.

What is claimed is:

1. A display device, comprising:

a light emitting diode disposed in a pixel; and an emission control transistor disposed in the pixel, and controlling on and off of the light emitting diode according to an emission control signal for each frame, wherein the frame is divided into a first duty section to a K-th duty section which are arranged according to time order and each of which includes an on-duty period and an off-duty period, wherein the first to K-th duty sections have the same length, wherein the on-duty period of the first duty section is longer than the on-duty period of each of the second to K-th duty sections, wherein the first to K-th duty sections includes the first duty section, the second duty section immediately after the first duty section, and a third duty section immediately after the second duty section, wherein the on-duty period of the first duty section is longer than the on-duty period of each of the second and third duty sections, and wherein in each of the first to K-th duty sections, the on-duty period precedes the off-duty period.

2. The display device of claim 1, wherein the on-duty period of the K-th duty section is shorter than the on-duty period of each of the first to (K−1)-th duty sections.

3. The display device of claim 1, wherein the on-duty periods of the second to K-th duty sections sequentially decrease.

4. The display device of claim 1, wherein the on-duty periods of the second to K-th duty sections are the same.

5. The display device of claim 1, wherein some of the on-duty periods of the second to K-th duty sections are the same.

6. The display device of claim 1, wherein the on-duty periods of the second to K-th duty sections sequentially increase.

7. The display device of claim 1, wherein the on-duty periods of the second to K-th duty sections are different from each other without sequentially decreasing or increasing.

8. A display device, comprising:

a light emitting diode; and an emission control transistor connected to the light emitting diode, and controlling on and off of the light emitting diode for each frame, wherein the frame is divided into a first duty section to a K-th duty section which are arranged according to time order and each of which includes an on-duty period and an off-duty period, wherein the first to K-th duty sections have the same length, wherein the on-duty period of the first duty section is longer than the on-duty period of each of the second to K-th duty sections, wherein the first to K-th duty sections includes the first duty section, the second duty section immediately after the first duty section, and a third duty section immediately after the second duty section, wherein the on-duty period of the first duty section is longer than the on-duty period of each of the second and third duty sections, and wherein in each of the first to K-th duty sections, the on-duty period precedes the off-duty period.

9. The display device of claim 8, wherein the on-duty period of the K-th duty section is shorter than the on-duty period of each of the first to (K−1)-th duty sections.

10. The display device of claim 8, wherein the on-duty periods of the second to K-th duty sections sequentially decrease.

11. The display device of claim 8, wherein the on-duty periods of the second to K-th duty sections are the same.

12. The display device of claim 8, wherein some of the on-duty periods of the second to K-th duty sections are the same.

13. The display device of claim 8, wherein the on-duty periods of the second to K-th duty sections sequentially increase.

14. The display device of claim 8, wherein the on-duty periods of the second to K-th duty sections are different from each other without sequentially decreasing or increasing.

15. A display method, comprising:

receiving a frame of a video signal; and dividing the frame into a first section to a K-th section having a same time duration, the first section to the K-th section arranged according to time order, wherein a duty cycle of the first section is larger than that of the K-th section, wherein the first to K-th sections includes the first section, a second section immediately after the first section, and a third section immediately after the second section, wherein the duty cycle of the first section is longer than a duty cycle of each of the second and third sections, wherein each of the first to K-th sections includes an on-duty period and an off-duty period, and wherein in each of the first to K-th sections, the on-duty period precedes the off-duty period.

16. The display method of claim 15, wherein the duty cycle of the K-th section is shorter than the duty cycle of each of the first to (K−1)-th sections.

17. The display method of claim 15, wherein the duty cycles of the second to K-th sections sequentially decrease.

18. The display method of claim 15, wherein the duty cycles of the second to K-th sections are the same.

19. The display method of claim 15, wherein the duty cycles of the second to K-th sections sequentially increase.

20. The display method of claim 15, wherein the duty cycles of the second to K-th sections are different from each other without sequentially decreasing or increasing.

21. The display device of claim 1, wherein a data writing operation is performed in the off-duty period of the first duty section for each frame.

22. The display device of claim 8, wherein a data writing operation is performed in the off-duty period of the first duty section for each frame.

* * * * *